United States Patent
Shang et al.

(10) Patent No.: US 11,106,571 B2
(45) Date of Patent: Aug. 31, 2021

(54) IDENTIFICATION OF INPUT OBJECT IN A GRAPHICAL USER INTERFACE

(71) Applicant: MICRO FOCUS LLC, Santa Clara, CA (US)

(72) Inventors: Er-Xin Shang, Shanghai (CN); Hao-Bin Cui, Shanghai (CN); Wen-Jie Qian, Shanghai (CN)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/711,537

(22) Filed: Dec. 12, 2019

(65) Prior Publication Data

US 2021/0182184 A1 Jun. 17, 2021

(51) Int. Cl.
G06F 11/36 (2006.01)

(52) U.S. Cl.
CPC ...... G06F 11/3688 (2013.01); G06F 11/3684 (2013.01)

(58) Field of Classification Search
CPC ............ G06F 11/3684; G06F 11/3688
See application file for complete search history.

(56) References Cited

U.S. PATENT DOCUMENTS

| | | | |
|---|---|---|---|
| 8,062,134 B2 | 11/2011 | Kelly et al. | |
| 10,853,227 B2* | 12/2020 | Dhanaraj | G06F 11/3664 |
| 2011/0296382 A1* | 12/2011 | Pasternak | G06F 11/3688 |
| | | | 717/124 |
| 2016/0309118 A1 | 10/2016 | Li et al. | |
| 2019/0102073 A1 | 4/2019 | Naidoo et al. | |
| 2020/0356465 A1* | 11/2020 | Li | G06F 11/3664 |
| 2021/0089436 A1* | 3/2021 | Gangina | G06F 11/3672 |

FOREIGN PATENT DOCUMENTS

| | | |
|---|---|---|
| CA | 2708685 | 4/2011 |
| CN | 104615538 | 5/2015 |
| WO | WO2019144680 | 11/2018 |
| WO | WO2019205146 A1 | 10/2019 |

OTHER PUBLICATIONS

Sushant Patil et al., Automated Software testing for High-end Touch Screen Automotive Displays, IEEE, 2015, retrieved online on May 21, 2021, pp. 1-4. Retrieved from the Internet: <URL: https://ieeexplore.ieee.org/stamp/stamp.jsp?tp=&arnumber=7386880>. (Year: 2015).*

Archana Jagdale, et al., "Galen Automation Tool-Layout Testing," Published on Feb. 19, 2017, 13 pages.

PCT Application No. PCT/CN2018/124812, filed Dec. 28, 2018, 33 pages.

* cited by examiner

*Primary Examiner* — Hanh Thi-Minh Bui (57) ABSTRACT

A computing device includes a processor and a medium storing instructions. The instructions are executable by the processor to: record a test script for an application in a first display configuration, the test script including a user interaction with an input object in a graphical user interface (GUI) of the application; in response to reaching the user interaction during a configuration execution of the recorded test script, determine identifier information of the input object for each of a plurality of display configurations; and store the identifier information of the input object for each of the plurality of display configurations, the stored identifier information used during testing executions of the test script.

17 Claims, 7 Drawing Sheets

IDENTIFICATION OF INPUT OBJECT IN A GRAPHICAL USER INTERFACE

BACKGROUND

With increasing use of computer systems, it becomes important to have reliable software. As such, software applications are often subjected to extensive testing to detect and eliminate errors. For software application with graphical user interfaces (GUIs), such testing may involve interacting with screen elements in different combinations and/or scenarios. For example, a tester may use a computer mouse to select various screen elements such as buttons, sliders, hyperlinks, menus, and so forth.

BRIEF DESCRIPTION OF THE DRAWINGS

Some implementations are described with respect to the following figures.

DETAILED DESCRIPTION

Testing of computer applications with graphical user interfaces (GUIs) can be time-consuming and expensive. Such testing may include human operators performing various GUI input commands, such as mouse clicks, keyboard inputs, and so forth. As such, it may be desirable to automate the testing of GUIs, which may reduce the time and cost associated with software validation. For example, a script may be generated by recording manual actions of a human tester, and the script may be executed or replayed later to perform automated testing. Such scripts may store information that identifies the GUI elements that receive user inputs. However, in some GUIs, the identification information of input elements may change when the display configuration of the GUI is modified (e.g., changed resolution, changed orientation, etc.). Accordingly, if the script is executed under a different display configuration than that used when the testing script was recorded, the script may fail due to inability to properly identify the input element.

As described further below with reference to FIGS. 1-6, some implementations may provide an improved technique for automated testing of an application and/or GUI. In some examples, a testing tool can record user interactions with a GUI to generate a test script. The testing tool may perform a configuration execution of the recorded script. When the configuration execution reaches an input object (also referred to as a "test object") in the test script, the testing tool may modify the input object to include a temporary tag. The testing tool may then change the GUI into various display configurations, may locate a GUI object having the temporary tag in each display configuration, and may determine identification information for the located GUI object in each display configuration. Further, the testing tool may store the identification information for each display configuration. The stored identification information may be used during testing executions of the test script to identify the input object in different display configurations. Accordingly, the disclosed technique may improve the automated testing of GUIs.

Figure 1:
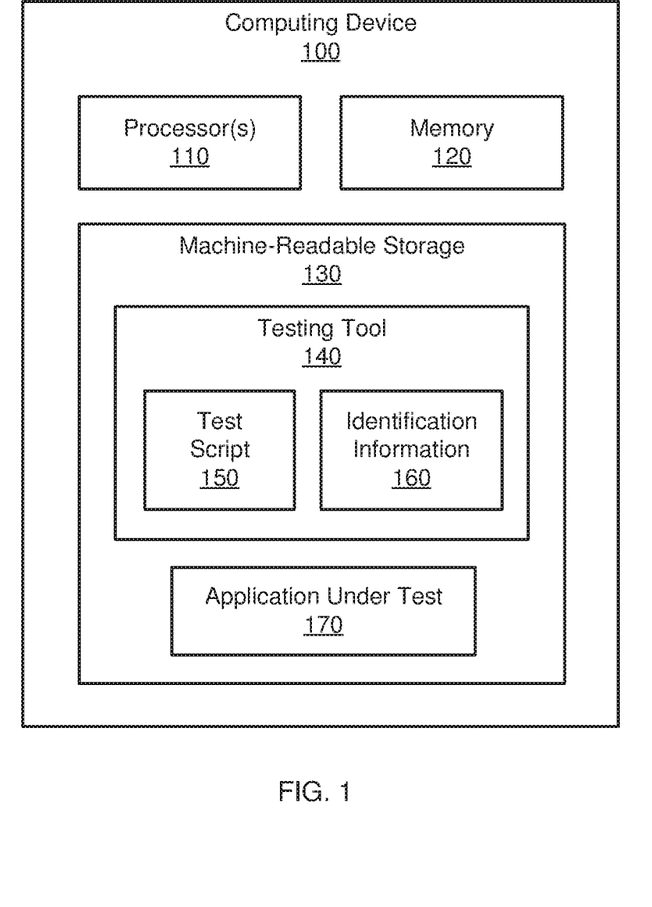
FIG. 1 is a schematic diagram of an example system, in accordance with some implementations.

FIG. 1 is a schematic diagram of an example computing device 100, in accordance with some implementations. The computing device 100 may be, for example, a computer, a portable device, a server, a network device, a communication device, etc. Further, the computing device 100 may be any grouping of related or interconnected devices, such as a blade server, a computing cluster, and the like. Furthermore, in some implementations, the computing device 100 may be a dedicated device or appliance for automated analysis and/or testing of GUIs.

As shown, the computing device 100 can include processor(s) 110, memory 120, and machine-readable storage 130. The processor(s) 110 can include a microprocessor, microcontroller, processor module or subsystem, programmable integrated circuit, programmable gate array, multiple processors, a microprocessor including multiple processing cores, or another control or computing device. The memory 120 can be any type of computer memory (e.g., dynamic random access memory (DRAM), static random-access memory (SRAM), etc.).

In some implementations, the machine-readable storage 130 can include non-transitory storage media such as hard drives, flash storage, optical disks, etc. As shown, the machine-readable storage 130 can include a testing tool 140, a test script 150, identification information 160, and an application under test (AUT) 170. In some examples, the test script 150 and/or the identification information 160 may be included or stored within the testing tool 140. However, in other examples, the test script 150 and/or the identification information 160 may be external to the testing tool 140.

As shown in FIG. 1, in some implementations, the testing tool 140 and/or the AUT 170 may be implemented as executable instructions stored in the machine-readable storage 130. However, the testing tool 140 and/or the AUT 170 can be implemented in any suitable manner. For example, the AUT 170 shown in FIG. 1 may represent a browser application displaying a web page hosted by a remote server (not shown in FIG. 1). The web page may be composed using hypertext markup language (HTML), extensible markup language (XML), and so forth. In another example, some or all of testing tool 140 and/or the AUT 170 could be hard-coded as circuitry included in the processor(s) 110. In other examples, some or all of testing tool 140 and/or the AUT 170 could be implemented on a remote computer (not shown), as web services, and so forth. In yet another example, the testing tool 140 and/or the AUT 170 may be implemented in one or more controllers of the computing device 100. In some implementations, the test script 150 and/or the identification information 160 may be implemented and/or stored in one or more organized structures (e.g., script files, relational tables, extensible markup language (XML) files, flat files, and so forth).

In one or more implementations, the AUT 170 may include or generate a graphical user interface (GUI). In some examples, the GUI of the AUT 170 may be presented in a display device (not shown in FIG. 1) connected to the computing device 100. Example implementations of the GUI of the AUT 170 are discussed below with reference to FIGS. 2A-2C. In one or more implementations, the testing tool 140 may generate the test script 150 by recording user interactions with a GUI of the AUT 170. Once completed, the test script 150 may be stored in the machine-readable storage 130 (or another location), and may be executed in order to test the AUT 170.

Figure 2A:
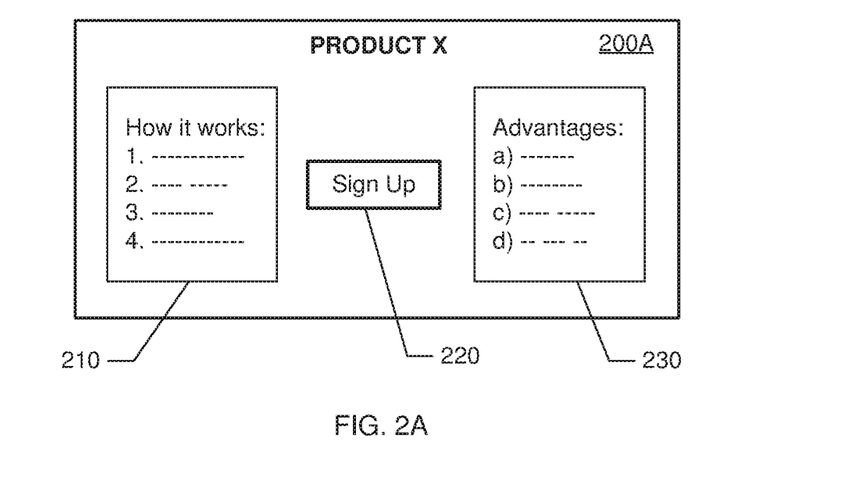
FIGS. 2A-2C are illustrations of example graphical user interfaces, in accordance with some implementations.
Figure 2B:
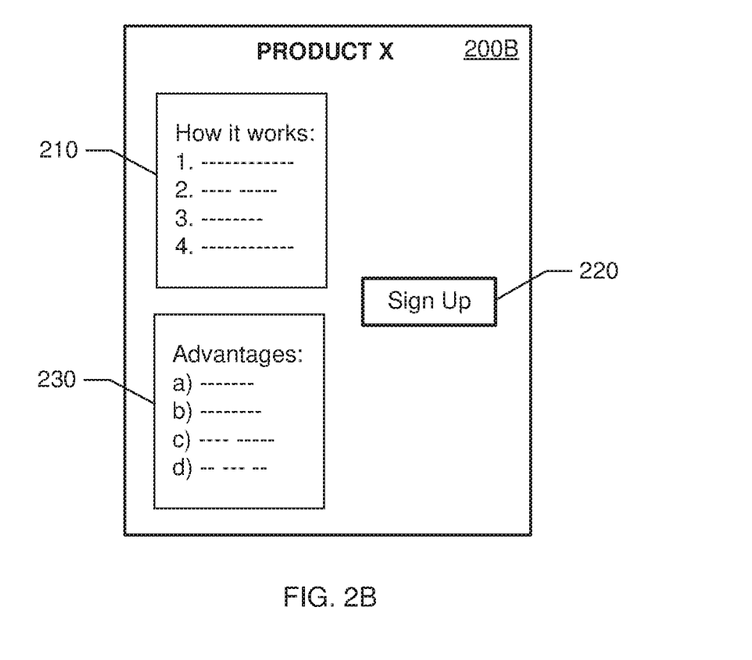
Figure 2C:
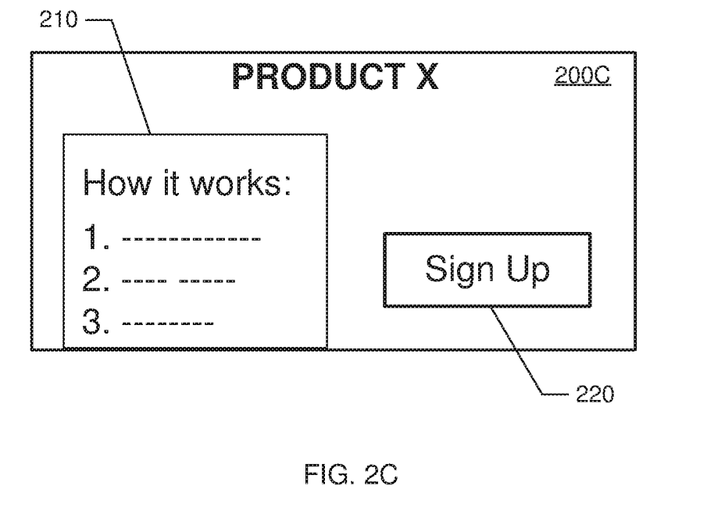

Referring now to FIGS. 2A-2C, shown are example GUI screens 200A-200C, in accordance with some implementations. The GUI screens 200A-200C may correspond generally to example GUIs of the AUT 170 (shown in FIG. 1) in various display configurations (e.g., different display orientations, resolutions, aspect ratios, and so forth). For example, referring to FIG. 2A, the GUI 200A may illustrate an AUT interface screen configured in a "landscape" orientation and a "high" resolution (e.g., a 1920×1024 resolution presented on a desktop display). As shown, the GUI 200A may include text portions 210, 230 and an input object 220. As used herein, the term "input object" refers to a GUI element that a user can interact with to cause an input to the AUT (e.g., to enter a command, to select a menu option, to enter text, to activate a control, and so forth). For example, a user may select or activate the input object 220 using an input device (e.g., a keyboard, a computer mouse, a touchscreen, etc.) (not shown). The input object 220 may be a a button, an icon, a slider, a hyperlink, a menu, and so forth.

In one or more implementations, the testing tool 140 may identify the input object 220 using information associated with the GUI 200A. In some implementations, the input object 220 may be identified by a particular node of a hierarchical tree structure that represents the GUI 200A. For example, the input object 220 may be represented by a node in a Document Object Model (DOM) associated with the GUI 200A. In some examples, the DOM may be generated by a browser upon loading a web page. The DOM may represent the web page as a hierarchical tree of nodes, with each node having attributes and/or tags describing a particular element in the web page (e.g., an input element, a text box, an icon, an image, and so forth). The DOM may provide a client-side programming interface to access and modify elements of the web page (e.g., using JavaScript or other programming languages). For example, the DOM may provide methods to identify specific elements (e.g., by identifier, name, tag, class, etc.) and to edit the elements (e.g., add attributes, delete attributes, modify attributes, etc.). In other implementations, the input object 220 may be identified by a particular position in the GUI 200A, by a set of coordinates, and so forth. Other combinations and/or variations are also possible.

In some examples, a change to the GUI display configuration may cause a change in the information identifying the input object 220. Referring now to FIG. 2B, the GUI 200B may correspond to the GUI 200A (shown in FIG. 2A) after a rotation of 90 degrees. For example, the GUI 200B may illustrate the AUT interface screen configured in a "portrait" orientation and a "high" resolution. As shown, the input object 220 may have a position within GUI 200B that is different from its position within GUI 200A, and therefore the information that identifies the input object 220 may also be changed. For example, a node identifying the input object 220 may be moved to a different level and/or position within a DOM hierarchy representing the AUT interface screen. Accordingly, a test script that is recorded using the GUI 200A (shown in FIG. 2A) may not properly locate the input object 220 if executed using the GUI 200B, and may thereby result in an error.

Referring now to FIG. 2C, the GUI 200C may correspond to the GUI 200A (shown in FIG. 2A) when presented in a smaller display resolution. For example, the GUI 200B may illustrate the AUT interface screen configured in a "landscape" orientation and a "low" resolution (e.g., a 1024×768 resolution displayed by a handheld device). As shown, the input object 220 may have a position within GUI 200C that is different from the positions within GUI 200A or GUI 200B. Accordingly, a test script that is recorded using the GUI 200A (shown in FIG. 2A) may not properly locate the input object 220 if executed using the GUI 200C, and may result in an error.

Referring again to FIG. 1, in some implementations, the testing tool 140 may include functionality to allow the test script 150 to be used in multiple display configurations. In some implementations, after completing the recording of the test script 150, the testing tool 140 may initiate a configuration execution of the test script 150. As used herein, a "configuration execution" refers to an execution of a test script that is performed to gather identification information of input object(s) in various display configurations.

In one or more implementations, when the configuration execution reaches an interaction with an input object (e.g., input object 220 shown in FIG. 2A) in the test script 150, the testing tool 140 may add a temporary tag for the input object in the GUI. For example, the testing tool 140 may use a method of a DOM associated with the GUI to edit or modify the node in the DOM that represents the input object. The node may be modified to include a customized attribute or other identifier indicating that the node corresponds to the input object. In another example, the testing tool 140 may temporarily modify the AUT 170 to include a specialized tag or identifier for the input object. In some implementations, after the configuration execution of the test script 150 is completed, the temporary tag may be deleted or not be maintained.

In some implementations, the testing tool 140 may change the GUI into various display configurations, and may use the temporary tag to determine the identification information 160 for the input object in each display configuration. For example, the testing tool 140 may search for an object in the GUI that is associated with the temporary tag (e.g., a GUI object that has a DOM node including the temporary tag). Further, upon locating an object associated with the temporary tag, the testing tool 140 may determine identification information for the located object (e.g., identify unique characteristics or identifiers of the DOM node including the temporary tag). In some examples, the testing tool 140 may store the identification data in the machine-readable storage 130 or other location.

In one or more implementations, during subsequent executions of the test script 150 (i.e., after the configuration execution), the testing tool 140 may use the stored identification information 160 to correctly identify the input object while using a particular display configuration. The functionality of the testing tool 140 is described further below with reference to FIGS. 3-6, which show various non-limiting examples.

Figure 3:
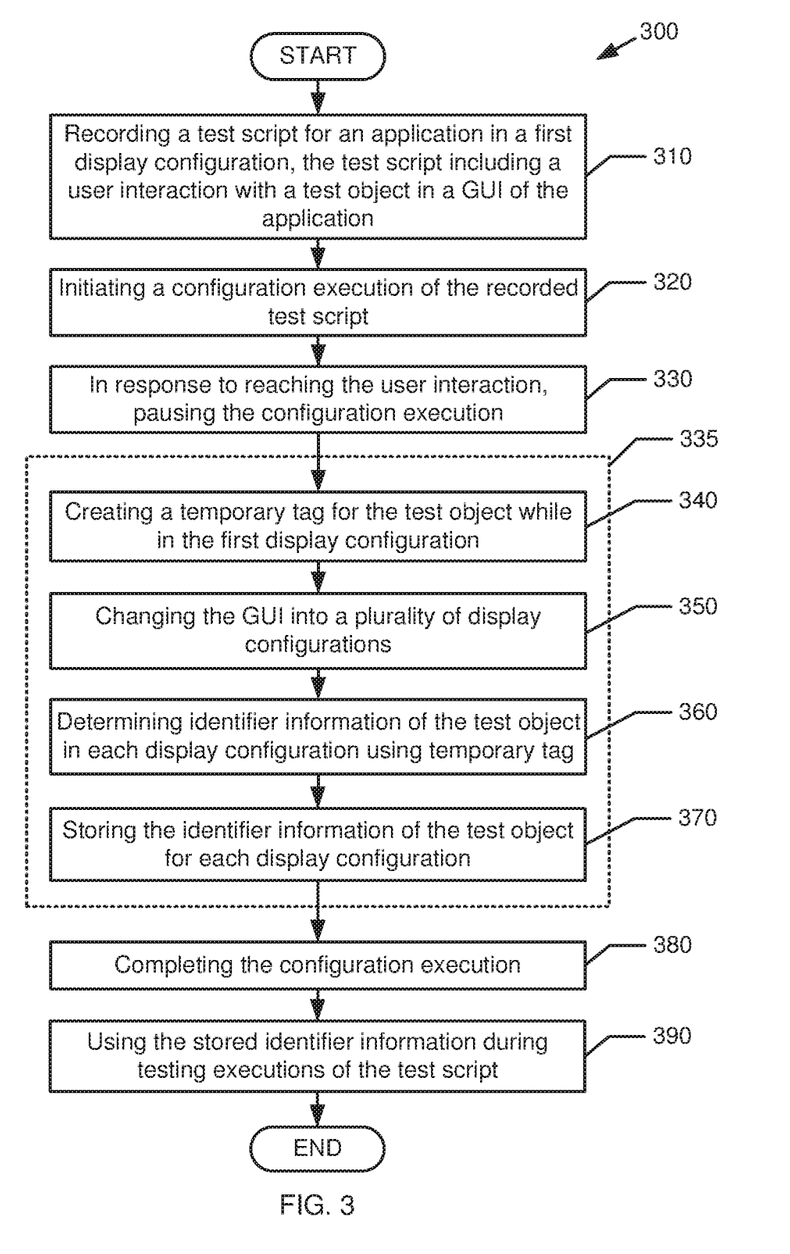
FIG. 3 is a flow diagram of an example process, in accordance with some implementations.

Referring now to FIG. 3, shown is an example process 300, in accordance with some implementations. In some examples, the process 300 may be performed by some or all of the computing device 100 shown in FIG. 1. The process 300 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 300 may be described below with reference to FIGS. 1 and 2A-2C, which shows examples in accordance with some implementations. However, other implementations are also possible.

Block 310 may include recording a test script for an application in a first display configuration, the test script including a user interaction with a test object in a GUI of the application. For example, referring to FIGS. 1-2A, the testing tool 140 may generate the test script 150 by recording a series of actions performed by a user in the GUI 200A with a first display configuration (e.g., "landscape" orientation and a "high" resolution). The test script 150 may include a user interaction with the input object 220 included in the GUI 200A.

Block 320 may include initiating a configuration execution of the recorded test script. For example, referring to FIGS. 1-2A, the testing tool 140 may initiate a configuration execution of the recorded test script 150, thereby causing the series of actions to be automatically performed in the GUI 200A in the same order that they were recorded into the test script 150. In some examples, the configuration execution is not performed for testing purposes, but is performed to gather identification information in multiple display configurations.

Block 330 may include, in response to reaching the user interaction, pausing the configuration execution. For example, referring to FIGS. 1-2A, the testing tool 140 may determine that the configuration execution of the test script 150 has reached the user interaction with the input object 220, and in response may pause the configuration execution at that point in the test script 150.

Box 335 (shown in dotted line) indicates that blocks 340-370 occur while the configuration execution remains paused (i.e., in the pause performed at block 330). Block 340 may include creating a temporary tag for the test object while in the first display configuration. For example, referring to FIGS. 1-2A, during the pause in the configuration execution, the testing tool 140 may modify data of the GUI 200A (e.g., using a DOM method to edit a DOM node corresponding to the input object 220) to include a temporary tag (e.g., a customized attribute value). In some examples, the temporary tag may be a specialized attribute or dummy value indicating that the associated GUI object is a test object or input object accessed in the test script 150. In some examples, the temporary tag may be intended for use during the configuration execution of the test script 150. As such, the temporary tag may not be present in the GUI data during later executions of the test script 150 for testing the AUT 170.

Block 350 may include changing the GUI into a plurality of display configurations. For example, referring to FIGS. 1-2C, during the pause in the configuration execution, the testing tool 140 may cause the GUI 200A to be sequentially presented in multiple display configurations (e.g., as GUI 200B shown in FIG. 2B, as GUI 200C shown in FIG. 2C). In some examples, the testing tool 140 may modify display settings of the computing device 100 according to display configurations that are specified in a stored data structure (e.g., a configuration file).

Block 360 may include determining identifier information of the test object for each display configuration using the temporary tag. Block 370 may include storing the identifier information of the test object for each display configuration. For example, referring to FIGS. 1-2C, while the GUI is displayed in each display configuration (e.g., applied in block 350), the testing tool 140 may search for an object in the GUI that includes or is associated with the temporary tag (e.g., using a DOM method to locate a DOM node that includes the customized attribute value). Upon locating an object associated with the temporary tag, the testing tool 140 may determine identification information 160 for the located object (e.g., using a DOM method to determine a unique identifier of the DOM node including the customized attribute value) for each display configuration. In some examples, the unique identifier of the DOM node may be an attribute value (or combination of multiple attribute values) that is generated by the code of the GUI itself (e.g., by HTML and/or XML of a web page), and that is not added by a DOM method. Further, the testing tool 140 may store the identification data 160 in the machine-readable storage 130 or other location. In some examples, the identification data 160 may include multiple data entries, with each entry including an identifier of a particular display configuration and the identification information 160. Further, in some examples, the entry may include a name of the input object.

Block 380 may include completing the configuration execution. For example, referring to FIG. 1, after determining and storing identifier information of the test object for each display configuration (e.g., in blocks 340-370), the testing tool 140 may end the execution pause, and may complete the configuration execution of the test script 150.

Block 390 may include using the stored identifier information during testing executions of the test script. For example, referring to FIG. 1, the testing tool 140 may use the identification information 160 during testing executions of the test script 150 (i.e., executions of the test script 150 for testing the AUT 170) to identify the input object while using a particular display configuration. In some examples, the testing tool 140 may perform a look-up an entry of the identification information 160 by matching the current display configuration and the name of the desired input object, and may thereby retrieve information from the entry (e.g., an identifier of a DOM node) that is usable by the testing tool 140 to locate the object in the GUI under the current display configuration. After block 390, the process 300 is completed.

In some implementations, the process 300 may be modified or adapted for multiple input objects. For example, blocks 340-370 may be repeated multiple times during a configuration execution to store identification data for multiple input objects included in a GUI of the AUT 170. Other combinations and/or variations are also possible.

In one or more implementations, if the identifier information of the test object cannot be determined for a particular display configuration entered during the configuration execution (i.e., in block 360), the testing tool 140 may receive user input describing additional actions to be included in (or used along with) the test script 150. For example, referring to FIG. 2A, assume that a configuration execution of the test script 150 changes the GUI 200A into the display configuration in which the input object 220 is no longer visible and/or accessible. Thus, in this example, the testing tool 140 may be unable to locate the temporary tag and/or the input object 220, and thus may be unable to determine the identifier information 160 of the test object for such a display configuration. In response to being unable to locate the temporary tag and/or the input object 220, the testing tool 140 may request the user to perform additional action(s) (i.e., actions not included in the testing script 150 as originally recorded) to substitute for the user interaction with the input object 220. For example, in response to a prompt from the testing tool 140, the user may select a different input element, enter a text command, perform a series of commands, and so forth. The testing tool 140 may record the additional action(s), and may store information regarding the additional action(s) in the test script 150 and/or the identification information 160. Further, when a testing execution of the test script 150 uses the same display configuration, the testing tool 140 may use the stored information to perform the additional action(s) instead of performing the user interaction with the input object 220 (i.e., in place of the user interaction recorded in the initial recording of the test script 150). Accordingly, in such a manner, the testing tool 140 can adapt the test script 150 for use in display configurations in which the input object 220 is not visible and/or accessible.

Figure 4:
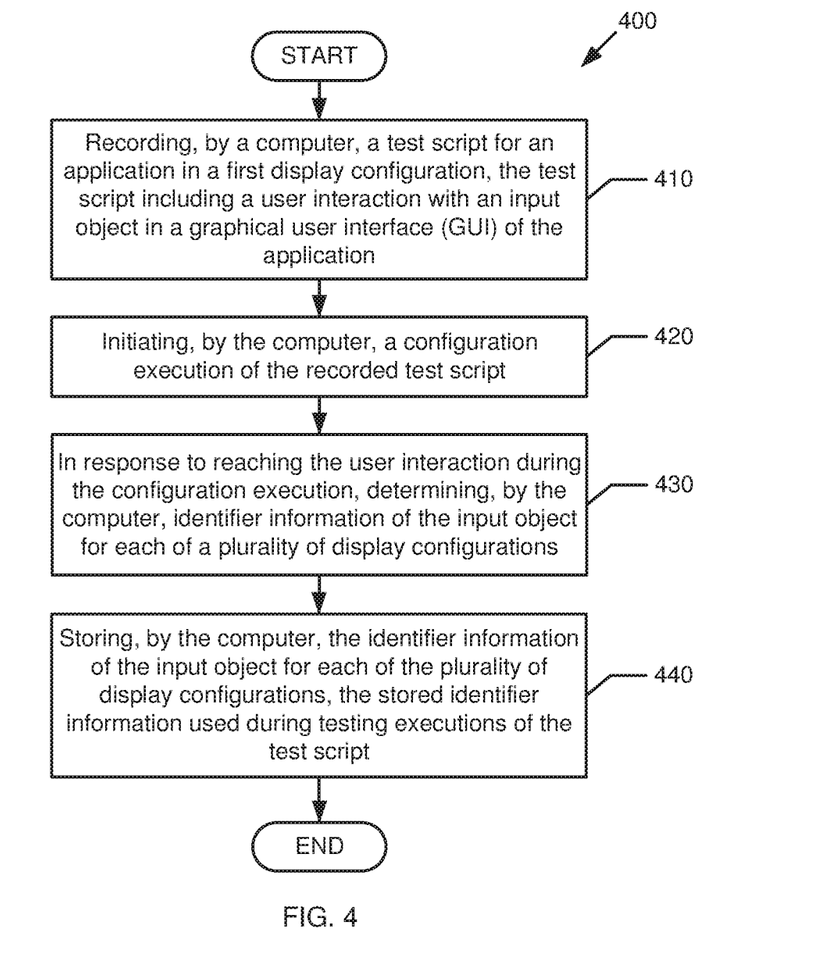
FIG. 4 is a flow diagram of an example process, in accordance with some implementations.

Referring now to FIG. 4, shown is an example process 400, in accordance with some implementations. In some examples, the process 400 may be performed by some or all of the computing device 100 shown in FIG. 1. The process 400 may be implemented in hardware and/or machine-readable instructions (e.g., software and/or firmware). The machine-readable instructions are stored in a non-transitory computer readable medium, such as an optical, semiconductor, or magnetic storage device. For the sake of illustration, details of the process 400 may be described below with reference to FIGS. 1 and 2A-2C, which shows examples in accordance with some implementations. However, other implementations are also possible.

Block 410 may include recording, by a computer, a test script for an application in a first display configuration, the test script including a user interaction with an input object in a graphical user interface (GUI) of the application. For example, referring to FIGS. 1-2A, the testing tool 140 may record the test script 150 by capturing a sequence of actions performed by a user in the GUI 200A with a first display configuration.

Block 420 may include initiating, by the computer, a configuration execution of the recorded test script. For example, referring to FIGS. 1-2A, the testing tool 140 may initiate a configuration execution of the recorded test script 150.

Block 430 may include, in response to reaching the user interaction during the configuration execution, determining, by the computer, identifier information of the input object for each of a plurality of display configurations. For example, referring to FIGS. 1-2A, the testing tool 140 may determine that the configuration execution of the test script 150 has reached the user interaction with the input object 220, and in response may pause the configuration execution of the test script 150. During the pause, the testing tool 140 may add a temporary tag for the input object 220 (e.g., using a DOM method to modify the DOM node for the input object to include a customized attribute value), cause the GUI 200A to change into multiple display configurations, search for a GUI object that is associated with the temporary tag in each display configuration (e.g., using a DOM method to locate a DOM node that includes the customized attribute value), and determine identification information 160 for the located GUI object in each display configuration (e.g., using a DOM method to determine a unique identifier for the DOM node that includes the customized attribute value).

Block 440 may include storing, by the computer, the identifier information of the input object for each of the plurality of display configurations, the stored identifier information used during testing executions of the test script. For example, referring to FIG. 1, the testing tool 140 may store the identification data 160 in the machine-readable storage 130 or other location. In some examples, the testing tool 140 (or another program) may use the identification information 160 during testing executions of the test script 150 to identify the input object while in a particular display configuration. After block 440, the process 400 is completed.

Figure 5:
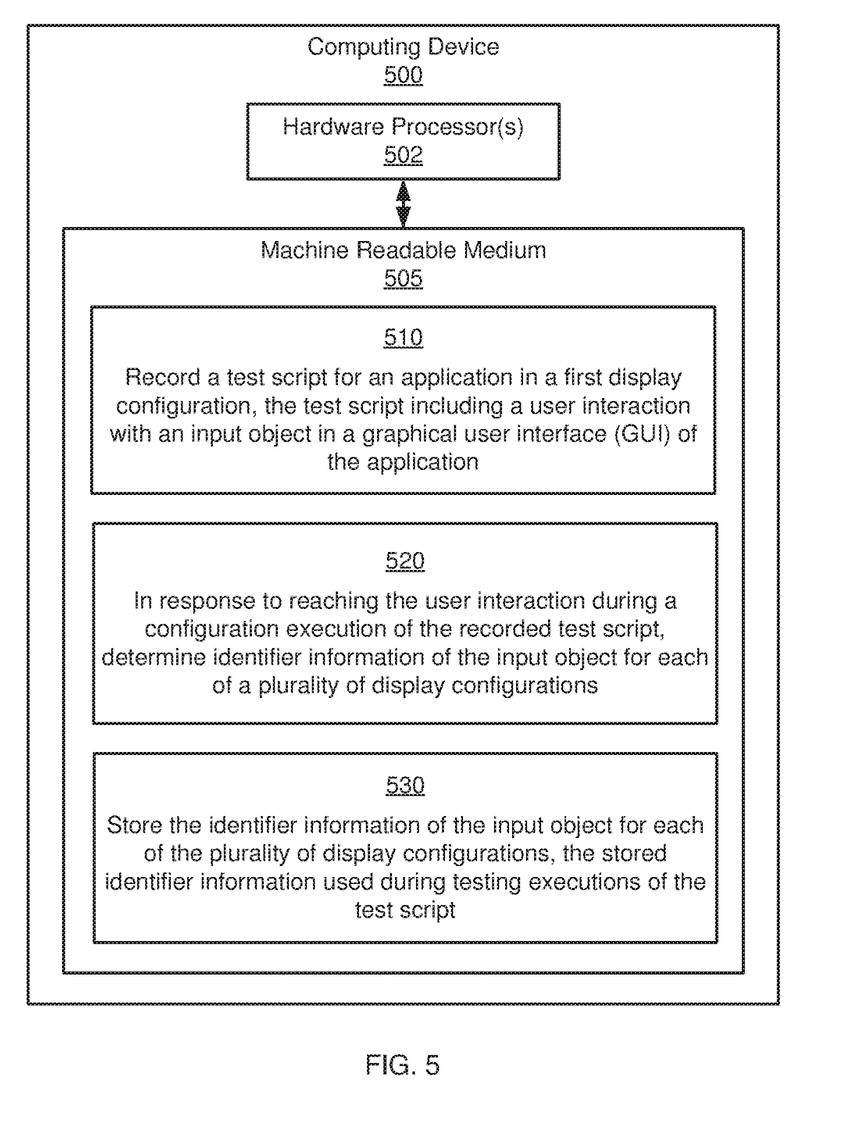
FIG. 5 is a schematic diagram of an example computing device, in accordance with some implementations.

Referring now to FIG. 5, shown is a schematic diagram of an example computing device 500. In some examples, the computing device 500 may correspond generally to the computing device 100 shown in FIG. 1. As shown, the computing device 500 may include hardware processor(s) 502 and machine-readable storage medium 505. The machine-readable storage medium 505 may be a non-transitory medium, and may store instructions 510-530. The instructions 510-530 can be executed by the hardware processor(s) 502.

Instruction 510 may be executed to record a test script for an application in a first display configuration, the test script including a user interaction with an input object in a graphical user interface (GUI) of the application. For example, referring to FIGS. 1-2A, the testing tool 140 may record the test script 150 by capturing a sequence of actions performed by a user in the GUI 200A with a first display configuration.

Instruction 520 may be executed to, in response to reaching the user interaction during a configuration execution of the recorded test script, determine identifier information of the input object for each of a plurality of display configurations. For example, referring to FIGS. 1-2A, the testing tool 140 may initiate a configuration execution of the recorded test script 150. Further, the testing tool 140 may determine that the configuration execution of the test script 150 has reached the user interaction with the input object 220, and in response may pause the configuration execution of the test script 150. During the pause, the testing tool 140 may add a temporary tag for the input object 220, cause the GUI 200A to change into multiple display configurations, search for a GUI object that is associated with the temporary tag in each display configuration, and determine identification information 160 for the located GUI object in each display configuration.

Instruction 530 may be executed to store the identifier information of the input object for each of the plurality of display configurations, the stored identifier information used during testing executions of the test script. For example, referring to FIG. 1, the testing tool 140 may store the identification data 160 in the machine-readable storage 130 or other location. In some examples, the testing tool 140 (or another program) may use the identification information 160 during testing executions of the test script 150 to identify the input object while in a particular display configuration.

Figure 6:
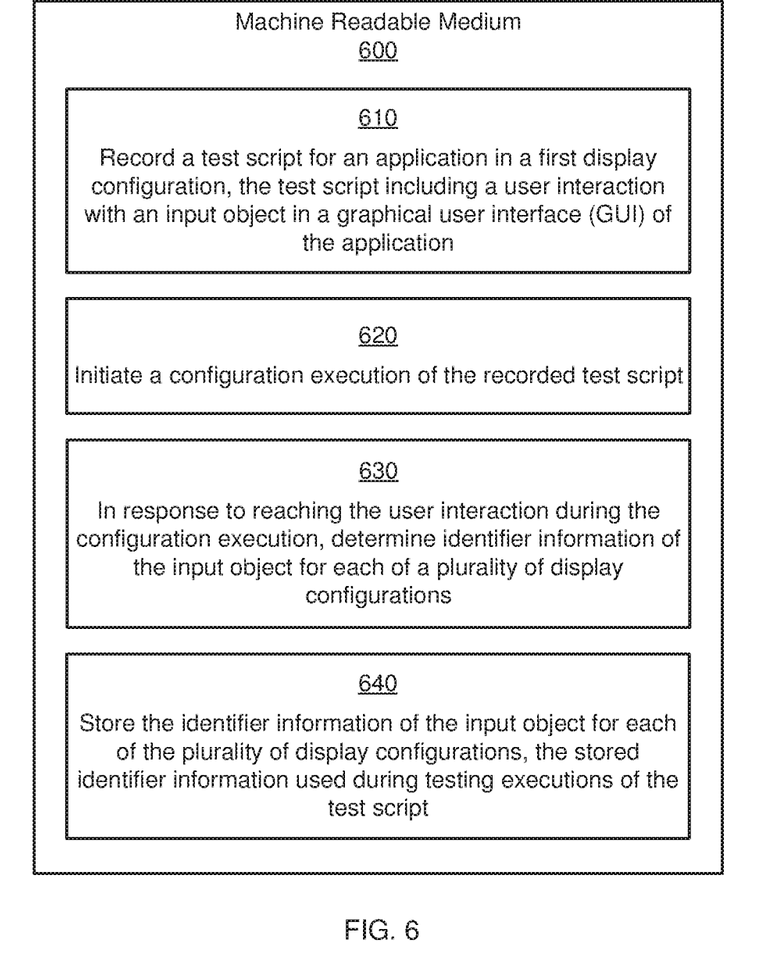
FIG. 6 is a diagram of an example machine-readable medium storing instructions in accordance with some implementations.

Referring now to FIG. 6, shown is machine-readable medium 600 storing instructions 610-640, in accordance with some implementations. The instructions 610-640 can be executed by any number of processors (e.g., the processor(s) 110 shown in FIG. 1). The machine-readable medium 600 may be a non-transitory storage medium, such as an optical, semiconductor, or magnetic storage medium.

Instruction 610 may be executed to record a test script for an application in a first display configuration, the test script including a user interaction with an input object in a graphical user interface (GUI) of the application. Instruction 620 may be executed to initiate a configuration execution of the recorded test script. Instruction 630 may be executed to, in response to reaching the user interaction during the configuration execution, determine identifier information of the input object for each of a plurality of display configurations. Instruction 640 may be executed to store the identifier information of the input object for each of the plurality of display configurations, the stored identifier information used during testing executions of the test script Note that, while FIGS. 1-6 show various examples, other implementations are contemplated. For example, referring to FIG. 1, it is contemplated that the computing device 100 may include additional components, fewer components, or different components. Further, while FIGS. 2A-2C illustrate various example GUIs and elements, implementations are not limited in this regard. Other combinations and/or variations are also possible.

In accordance with some implementations, examples are provided for automated testing of a GUI. In some examples, a testing tool can generate a testing script, and can perform a configuration execution of the recorded script. In response to reaching an input object in the test script, the testing tool may modify the input object to include a temporary tag. The testing tool may use the temporary tag to determine identification information for the input object in each display configuration. Further, the testing tool may store identification information for the input object in each display configuration. The stored identification information may be used during testing executions of the test script to identify the input object in different display configurations. Accordingly, some implementations may improve the automated testing of GUIs.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above.

What is claimed is:

1. A computing device comprising:
   a hardware processor; and
   a machine-readable storage medium storing instructions executable by the hardware processor to:
      record a test script for an operation of an application-under-test, the recorded test script including a recording of a user interaction with an input object in a graphical user interface (GUI) of the application-under-test;
      initiate a configuration execution of the recorded test script;
      in response to the configuration execution of the recorded test script reaching the recording of the user interaction with the input object in the recorded test script,
         pause the configuration execution of the recorded test script,
         change a display configuration of the GUI into a plurality of different display configurations, including instructions to change a characteristic of the input object in the GUI for each of the plurality of different display configurations,
         determine identifier information of the input object in the GUI for each of the plurality of different display configurations, and
         store the identifier information of the input object for each of the plurality of different display configurations;
      after storing the identifier information of the input object for the plurality of different display configurations, continue and complete the configuration execution of the recorded test script;
      initiate a testing execution of the test script to test the application-under-test in a particular display configuration; and
      identify, during the testing execution, the input object in the particular display configuration using the stored identifier information of the input object.

2. The computing device of claim 1, the instructions to change the characteristic of the input object in the GUI include instructions executable by the hardware processor to:
   change a location, an orientation, or a resolution of the input object in the GUI for each of the plurality of different display configurations.

3. The computing device of claim 1, the instructions executable by the hardware processor to:
   while the configuration execution is paused, create a temporary tag for the input object in the GUI.

4. The computing device of claim 3, wherein the temporary tag is a customized attribute added to a node in a document object model (DOM) of the GUI.

5. The computing device of claim 3, the instructions executable by the hardware processor to, while the configuration execution is paused:
   in each display configuration of the plurality of different display configurations, locate the input object that is associated with the temporary tag; and
   determine the identifier information for the input object based on a location of the input object in each display configuration.

6. The computing device of claim 1, wherein the plurality of different display configurations are specified in a stored data structure, and wherein the plurality of different display configurations include one of a plurality of display resolutions and a plurality of display orientations.

7. A non-transitory machine-readable storage medium storing instructions that upon execution cause a processor to:
   record a test script for an operation of an application-under-test, the recorded test script including a recording of a user interaction with an input object in a graphical user interface (GUI) of the application-under-test;
   initiate a configuration execution of the recorded test script;
   in response to reaching the recording of the user interaction with the input object in the recorded test script during the configuration execution, pause the configuration execution of the recorded test script,
change a display configuration of the GUI into a plurality of different display configurations, including instructions to change a characteristic of the input object in the GUI for each of the plurality of different display configurations,
determine identifier information of the input object in the GUI for each of the plurality of different display configurations, and
store the identifier information of the input object for each of the plurality of different display configurations;
after the identifier information of the input object for the plurality of different display configurations is stored, continue and complete the configuration execution of the recorded test script;
initiate a testing execution of the test script to test the application-under-test in a particular display configuration; and
identify, during the testing execution, the input object in the particular display configuration using the stored identifier information of the input object.

8. The non-transitory machine-readable storage medium of claim 7, wherein the instructions that cause the processor to change the characteristic of the input object in the GUI include instructions that cause the processor to:
change a location, an orientation, or a resolution of the input object in the GUI for each of the plurality of different display configurations.

9. The non-transitory machine-readable storage medium of claim 7, wherein the instructions further cause the processor to:
while the configuration execution is paused, generate a temporary tag for the input object in the GUI.

10. The non-transitory machine-readable storage medium of claim 9, wherein the temporary tag is a customized attribute added to a node in a document object model (DOM) of the GUI.

11. The non-transitory machine-readable storage medium of claim 9, wherein the instructions cause the processor to, while the configuration execution is paused:
in each display configuration of the plurality of different display configurations, locate the input object in the GUI using the temporary tag; and
determine the identifier information for the input object based on a location of the input object in each display configuration.

12. The non-transitory machine-readable storage medium of claim 7, wherein the plurality of different display configurations are specified in a stored data structure, and wherein the plurality of different display configurations include one of a plurality of display resolutions and a plurality of display orientations.

13. A computer implemented method, comprising:
recording, by a computer, a test script for an operation of an application-under-test, the recorded test script including a recording of a user interaction with an input object in a graphical user interface (GUI) of the application-under-test;
initiating, by the computer, a configuration execution of the recorded test script;
in response to reaching the recording of the user interaction with the input object in the recorded test script during the configuration execution,
pausing, by the computer, the configuration execution of the recorded test script,
changing, by the computer, a display configuration of the GUI into a plurality of different display configurations, including changing a characteristic of the input object in the GUI for each of the plurality of different display configurations,
determining, by the computer, identifier information of the input object in the GUI for each of the plurality of different display configurations, and
storing, by the computer, the identifier information of the input object for each of the plurality of different display configurations;
after storing the identifier information of the input object for the plurality of different display configurations, continuing and completing the configuration execution of the recorded test script;
initiating a testing execution of the test script to test the application-under-test in a particular display configuration; and
identifying, during the testing execution, the input object in the particular display configuration using the stored identifier information of the input object.

14. The computer implemented method of claim 13, wherein changing the characteristic of the input object in the GUI includes changing a location, an orientation, or a resolution of the input object in the GUI for each of the plurality of different display configurations.

15. The computer implemented method of claim 14, further comprising:
while the configuration execution is paused, generating a temporary tag for the input object in the GUI.

16. The computer implemented method of claim 15, wherein generating the temporary tag comprises using a first method of a document object model (DOM) of the GUI to add a customized attribute value to a DOM node representing the input object.

17. The computer implemented method of claim 16, further comprising:
in each display configuration, using a second method of the DOM to locate the DOM node having the customized attribute value; and
determining a unique identifier for the DOM node located in each display configuration, wherein the identifier information of the input object is the unique identifier for the DOM node.

* * * * *